United States Patent Office 3,707,529
Patented Dec. 26, 1972

3,707,529
ELASTOMERIC VINYLIDENE FLUORIDE POLYMERS WITH 55-95 PERCENT NON-IONIC END GROUPS
Edward K. Gladding, Wilmington, and Jack L. Nyce, Newark, Del., assignors to E. I. du Pont de Nemours and Company, Wilmington, Del.
No Drawing. Filed Sept. 4, 1970, Ser. No. 69,900
Int. Cl. C08f 15/06, 15/40
U.S. Cl. 260—80.77
4 Claims

ABSTRACT OF THE DISCLOSURE

An elastomeric vinylidene fluoride polymer consisting essentially of 30–70% by weight vinylidene fluoride units and 70–30% units of at least one other fluorinated ethylenically unsaturated monomer, the polymer having a 55–95 molar percent non-ionic end-group concentration and an inherent viscosity of 0.4 to 1.1 at 30° C. at a concentration of 0.1% by weight in a mixed solvent of 86.1% by weight tetrahydrofuran and 13.9% by weight dimethylformamide.

BACKGROUND

This invention relates to normally solid elastomeric copolymers of vinylidene fluoride and at least one other fluorine-containing monomer and a process for their preparation.

Elastomeric copolymers of vinylidene fluoride and other copolymerizable fluorine-containing monomers such as hexafluoropropene and tetrafluoroethylene are well known in the art and have an established place in commerce because of their excellent chemical and thermal stability. They can be prepared by free-radical catalyzed polymerization of the monomers alone or as solutions or dispersions in an organic solvent or water. Polymerization in an aqueous emulsion is, by far, the preferred method because of the rapid and complete conversion of monomers, easy removal of the heat of polymerization and ready isolation of the polymer; but this method requires the presence of a surface active agent to maintain the polymer in dispersed form until the polymerization is complete. Ordinary hydrocarbon soaps are unsuitable for this purpose because they inhibit the polymerization, so it is necessary to provide a fluorocarbon soap if the process is to be run efficiently. The fluorocarbon soap can be introduced as a separate ingredient in the polymerization, but this is usually avoided because of the high cost of such soaps. The usual alternative has been the use of a free-radical catalyst system (e.g. sodium persulfate) which provides ionizable terminal groups on low molecular weight polymer chains, thus allowing them to serve as surface active agents during the polymerization. This method, while efficient and economical, provides product polymers whose properties are highly dependent on the amount of catalyst used in the polymerization. If a small amount of catalyst is used, the polymerization proceeds to high molecular weight and the resulting polymers are highly viscous and quite difficult to process with the usual rubber mixing and shaping machinery. If, on the other hand, enough catalyst is supplied to keep the molecular weight (and thus the viscosity) low enough that the polymers can be processed readily, their vulcanizates have an undesirably high compression set. There is thus a need for fluoropolymer elastomers that have good processing properties (which can be made by an inexpensive process) and which provide vulcanizates with good compression set characteristics.

SUMMARY OF THE INVENTION

According to this invention there is provided an elastomeric polymer consisting essentially of 30–70% by weight vinylidene fluoride units and 30–70% by weight units of at least one other fluorinated ethylenically unsaturated monomer, said elastomeric polymer having an inherent viscosity of about 0.4–1.1 at 30° C. at a concentration of 0.1% by weight in a mixed solvent of 86.1% by weight tetrahydrofuran and 13.9% by weight dimethyl formamide, said polymer having a non-ionic end-group concentration of about 55–95 molar percent. These elastomers have good processing characteristics and provide vulcanizates with excellent compression set properties.

These novel elastomers are prepared by polymerizing vinylidene fluoride and at least one other fluorine-containing ethylenically unsaturated monomer in an aqueous medium in the presence of an inorganic free-radical initiator system and an organic chain transfer agent whose proportions are chosen to provide 5–45% ionic terminal groups on the polymer (derived from the inorganic initiator), and 55–95% non-ionic terminal groups on the polymer (derived from the organic transfer agent). This process is economical in that the inorganic initiator system produces a polymer product having sufficient ionic end groups to act as the necessary surface active agent, yet the proportion of ionic end groups in the polymer remains at such a low level that it has little or no effect on processing or vulcanizate properties.

DESCRIPTION OF THE INVENTION

Fluorinated monomers which can be polymerized with vinylidene fluoride to provide the novel copolymers of this invention are ethylenically unsaturated monomers containing at least as many fluorine atoms as carbon atoms (e.g. F≧C). Typical fluorinated monomers include trifluoroethylene, tetrafluoroethylene, trifluoropropene, hexafluoropropene, pentafluoropropene, hexafluorobutene, octafluorobutene, etc. Fluorinated olefins with one or more chlorine and/or bromine substituents can also be used. Perfluoro alkyl perfluoro vinyl ethers, such as perfluoro methyl perfluoro vinyl ethers, are also useful monomers.

Tetrafluoroethylene (TFE) and hexafluoropropene (HFP) are used in making several preferred polymers of this invention. One such preferred polymer consisting essentially of 30–70 weight percent vinylidine fluoride and 30–70 weight percent hexafluoropropene exhibits exceptional elastomeric properties, thermal stability and resistance to chemical degradation. Another preferred polymer consisting of 25–70 weight percent vinylidene fluoride, 19–60 weight percent hexafluoropropene and 3–35 weight percent tetrafluoroethylene exhibits good elastomeric properties and thermal stability. For this polymer a preferred range for the tetrafluoroethylene unit concentration is 15–25% by weight. The inorganic free-radical initiator system used in this invention can be based on any of those water soluble inorganic peroxidic substances known to the prior art such as sodium, potassium or ammonium persulfates, perphosphates, perborates or percarbonates. These can be further activated by reducing agents such as sodium, potassium or ammonium sulfite, bisulfite, metabisulfite, hyposulfite, thiosulfate, phosphite or hypophosphite or by easily oxidized metal compounds such as ferrous, cuprous and silver salts. The preferred initiator is ammonium persulfate and it is particularly preferred for use in a redox system with sodium bisulfite.

The amount of free-radical initiator(s) to be used is dependent upon the exact compounds chosen, the nature of the polymerization system and particularly upon the temperature of polymerization; but, in general, it should be chosen to produce in the absence of a transfer agent a polymer of very high molecular weight, i.e., a number average molecular weight in the range 365,000–500,000 corresponding to an inherent viscosity of 1.7–2.3 (as measured in the above solvent system). For the sodium bisulfite activated ammonium persulfate system in polymerizations at 100–110° C. it has been found that one mole of radical generator per 1500–2900 moles of monomers will give polymer in this molecular weight range. A trial or two can determine the exact amount for other systems. For purposes of this invention these polymers are considered to have a 100% ionic end group concentration. These groups are —COOH, —OSO$_3$H and —SO$_3$H groups or their salts depending on the pH and the presence of other cations. Chain transfer agents which can be used to produce the non-ionic end groups in the polymers of this invention are generally hydrocarbon alcohols, esters, halides, ketones or mercaptans containing 1–12 carbon atoms. Such transfer agents are known in the art and have been described in U.S. Pats. 3,069,401 to Gallagher and 3,080,347 to Sandberg. Choice of a suitable chain transfer agent for a particular polymerization will depend on such factors as (1) its relative solubility in water and the organic polymeric materials, (2) its reactivity, (3) its efficiency, that is, the amount required to produce the desired effect and (4) the ease of removal of any unused agent. Examples of particularly suitable agents from each of the general classes mentioned are isopropanol, diethylmalonate, carbon tetrachloride, acetone and dodecyl mercaptan. Other compounds which can be used include methanol, ethanol, methyl acetate, ethyl acetate, butyl acetate, ethyl propionate, ethyl acetoacetate, dimethyl malonate, dimethyl succinate, diethyl succinate, acetyl acetone, cyclohexanone, methylene chloride, methylene bromide and methylene iodide.

The various chain transfer agents are not equally efficient in performing their chain transfer function in different polymerization systems so the amount of agent to be used cannot be specified exactly in a manner that will cover all cases. In general, that amount is supplied that will produce a polymer product of this invention having an inherent viscosity of 0.4–1.1 (a molecular weight of 80,000 to 225,000) in the presence of free-radical initiator in sufficient amount to produce in the absence of the transfer agent a polymer of inherent viscosity of 1.7–2.3 (a molecular weight of 365,000–500,000). For a reasonably effective agent such as carbon tetrachloride this effect is achieved by adding a molar amount about equivalent to the moles of initiator used. For a less effective modifier such as diethyl malonate an amount around six times the molar amount of initiator will be needed for a similar effect. A few experiments should easily determine the exact amount for a particular system.

As used throughout this specification the "percent non-ionic end groups" is a value obtained by simple calculation from the results of two polymerizations, one with transfer agent and one without transfer agent but otherwise identical. The calculation is made on the basis that the inorganic free-radical initiator produces a polymer with 100% ionic end groups, and on the basis that the addition of a chain transfer agent, to an otherwise identical system, does not change the number of ionic end groups per gram of polymer. If $M_1$ represents the number average molecular weight of the 100% ionic end polymer (produced without chain transfer) and $M_2$ the number average molecular weight of the polymer containing the same amount of ionic ends and also non-ionic ends (produced with free-radical initiator and transfer agent), then the latter (polymers of this invention) contain $2/M_1$ moles of ionic ends per gram of polymer and $2/M_2 - 2/M_1$ moles of non-ionic ends per gram. Thus, the fraction of non-ionic ends is $$\frac{2/M_2 - 2/M_1}{2/M_2} = 1 - \frac{M_2}{M_1}$$

and the percent non-ionic ends is $$100(1 - M_2/M_1)$$

There is at present no precise method for analytical determination on an absolute basis of the concentrations of ionic and non-ionic ends; however, analyses of the polymer for sulfur content (from free-radical initiator), by potentiometric titration and for adsorption of a dye on the polar groups (colorimetric) have all given results which are consistent with the calculated values for non-ionic end group concentration for polymers produced under known conditions. Analytical determinations and comparisons are based on 100% ionic free-radical initiator polymerization. The polymerization reactions of this invention can be carried out in conventional fashion in either a batch or continuous manner. In a typical batch polymerization process, a bomb type cylindrical reactor is charged with deionized, deaerated water, polymerization catalyst and transfer agent. The bomb is capped and cooled to a temperature of about −80° C. Gaseous reactants are condensed therein and the bomb is sealed. The contents are agitated to disperse the components and to form a uniform emulsion. The bomb is heated to a temperature of 80–110° C. under autogenous pressure. Pressure decreases during the polymerization and approaches a relatively constant value as the polymerization nears completion. The bomb is then cooled and vented and polymer is recovered, purified and processed by conventional techniques.

A description of typical continuous polymerization conditions is given in the examples.

The polymers of this invention are normally solid elastomers and are stable up to at least about 200° C. These polymers can be characterized as high molecular weight elastomers having an inherent viscosity of over 0.30 and preferably 0.4 to 1.1. Inherent viscosity as used herein is measured at 30° C. with a 0.1% by weight polymer concentration in a mixed solvent of 86.1% by weight tetrahydrofuran and 13.9% by weight dimethyl formamide. The polymers can be compounded and cured by known methods to yield good vulcanizates for applications such as inert films, base components, gaskets, O-rings, etc.

An essential feature of the polymers of this invention is their 55–95 molar percent non-ionic end group concentration. Known solid elastomeric vinylidene fluoride copolymers have practically 100% ionic end groups and some low molecular weight polymers have practically all non-ionic end groups. Thus, known polymers have practically all end groups of one type, ionic or non-ionic. The polymer product of this invention can be processed and compounded by conventional methods used for other elastomeric vinylidene fluoride copolymers, and can include such conventional rubber additives as fillers, plasticizers, lubricants, etc. Compounded stock of the polymer can be vulcanized using conventional methods and agents for normally solid vinylidene fluoride copolymers. Certain vulcanizate properties of the polymer product are superior to those of vinylidene fluoride copolymers produced by conventional inorganic free-radical catalyst techniques. For example, high temperature compression set (HTCS) is significantly lower for the polymers of this invention than that for similar vinylidene fluoride copolymer prepared by conventional techniques. HTCS is a standard elastomeric property indicating the degree of volume recovery of an elastomer sample following a given deformation for a certain period of time. It is measured by standard ASTM test (ASTM No. D-395 Method B). The polymer products of this invention exhibit improved processability when compared with similar vinylidene fluoride copolymers produced by conventional inorganic free-radical catalyst methods. Processability is a qualitative indication of the ease with which a polymer can be milled or mixed with compounding ingredients. Processability is also indicated by lower Mooney viscosity values. Improved processability reduces the cost and product loss in compounding. Improved HTCS makes the polymer of this invention particularly useful in applications requiring high volume integrity with chemical and thermal stability. Such applications include use as gaskets, sealing washers, and O-rings in high temperature and corrosive environments.

The following examples illustrate the invention. All parts, proportions and percentages are by weight unless otherwise indicated.

Vinylidene fluoride and hexafluoropropene are metered at the rates given in the table, mixed, compressed, and continuously introduced into a two-liter autoclave. Catalyst components, ammonium persulfate and sodium bisulfite, and transfer agent also are mixed with deoxygenated water and continuously pumped into the autoclave by a separate line at the rates shown in the table. The autoclave is maintained liquid full and at a temperature of 50–150° C. Latex is removed at the top through a pressure reduction valve and the polymer is isolated by coagulation. It is washed with distilled water in a high-shear blender and oven dried. A control run using no transfer agent is made to compare the molecular weights and ionic end group concentrations of polymers made with and without a transfer agent.

The run conditions and properties of each polymer produced are tabulated in the following table:

TABLE I

| Examples | 1 | 2 | 3 | 4 | 5 |
|---|---|---|---|---|---|
| Reaction conditions: | | | | | |
| Ammonium persulfate feed (mole/hr.) | .0105 | .0105 | .0695 | .104 | .0113 |
| Sodium bisulfite feed (mole/hr.) | 0 | .0046 | .0305 | .0457 | 0 |
| Carbon tetrachloride feed (mole/hr.) | .0165 | .0186 | .0103 | 0 | 0 |
| Isopropyl alcohol feed (mole/hr.) | 0 | 0 | 0 | .0506 | 0 |
| Diethyl malonate feed (mole/hr.) | 0 | 0 | 0 | 0 | .069 |
| Vinylidene fluoride feed (mole/hr.) | 14.25 | 14.25 | 9.5 | 14.3 | 12.05 |
| Hexafluoropropene feed (mole/hr.) | 4.58 | 4.58 | 3.05 | 4.58 | 3.85 |
| Temperature (° C.) | 100 | 100 | 70 | 80 | 100 |
| Residence time (minutes) | 20 | 20 | 30 | 20 | 20 |
| Product properties; inherent viscosity: | | | | | |
| Without transfer agent | 2.3 | 2.2 | 1.7 | | 1.8 |
| With transfer agent | 0.81 | 0.72 | 0.69 | 0.88 | 0.76 |
| Number average molecular weight (thousands): | | | | | |
| Without transfer agent | 525 | 500 | 365 | | 390 |
| With transfer agent | 155 | 135 | 130 | | 145 |
| Calculated end group concentration, percent non-ionic groups | 70.5 | 73 | 64 | | 63 |

The polymers prepared with transfer agent were much more easily processed than the polymers prepared without transfer agent.

The following recipe was used in preparing the vulcanizates of the polymers of Examples 1–3:

Polymer _____ 100
MT black _____ 20
MgO _____ 15
Hexamethylenediamine carbamate _____ 1.7

Curing: Press cure 30 minutes at 160° C. and then post cure 4 one-hour steps to 400° F. and 24 hours at 205° C.

The following recipes were used to prepare the vulcanizates of the polymers of Examples 4 and 5 and their respective controls.

| Example and control | 4 | 5 | 5(a)[1] |
|---|---|---|---|
| Polymer | 100 | 100 | 100 |
| MT black | 20 | 30 | 30 |
| MgO | 15 | 10 | 10 |
| Hexamethylene diamine carbamate | 1.5 | | 1.5 |
| Hydroquinone | | 1.5 | |
| Dicyclohexyl-18-crown-6 [2] | | 2.0 | |
| Ca(OH)₂ | | 2.0 | |

[1] The polymer of Example 5 cured with a different recipe.
[2] Eicosahydrodibenzo[b,k]-[1,4,7,10,13,16]-hexaoxacyclooctadecine.

NOTE.—Curing: Example 4 and its control are press cured 30 minutes at 160° C. and then post cured in four one-hour steps to 205° C. and 24 hours at 205° C. Examples 5 and 5(a) and their controls are press cured 20 minutes at 160° C.

The following data compare the properties of vulcanizates of the polymers of Examples 1–5 prepared with transfer agent with vulcanizates of a polymer of the same monomer ratio prepared without a transfer agent and having an inherent viscosity of 0.85. Properties were determined following procedures of ASTM D412 and ASTM D395.

| Example | 1 | 2 | 3 | Control |
|---|---|---|---|---|
| $M_{100}$ | 500 | 485 | 600 | 575 |
| $T_B$ | 2,375 | 2,500 | 2,535 | 2,000 |
| $E_B$ | 210 | 230 | 200 | 200 |
| Set at break (percent) | 4 | 4 | 2 | 2 |
| Compression set: | | | | |
| 24 hours/400° F. | 34 | 37 | 36 | 40 |
| 70 hours/400° F. | 48 | 50 | 53 | 58 |
| Ninh | 0.81 | 0.72 | 0.69 | 0.85 |

| | Ex. 4 | Control | Ex. 5 | Control | Ex. 5(a) | Control |
|---|---|---|---|---|---|---|
| $M_{100}$ | 600 | 800 | 375 | 850 | 550 | 775 |
| $T_B$ | 2,435 | 2,710 | 1,185 | 1,790 | 1,800 | 2,025 |
| $E_B$ | 220 | 200 | 320 | 320 | 190 | 160 |
| Set at break (precent) | 3 | 2 | 15 | 4 | 2 | 2 |
| Compression set at 400° F.: | | | | | | |
| 24 hours | [1] 37 | [1] 51 | | | | |
| 70 hours | [1] 55 | [1] 67 | [2] 24 | [2] 26 | [2] 36 | [2] 41 |
| 24 hours | | | [1] 34 | [1] 36 | | |
| 70 hours | | | | | [1] 58 | [1] 59 |
| Ninh | 0.88 | 0.85 | 0.76 | 0.85 | 0.76 | 0.85 |

[1] Post cured, 400° F.
[2] Post cured, 450° F.

We claim:
1. An elastomeric polymer consisting essentially of 70–30% by weight vinylidene fluoride units and 30–70% by weight units of at least one other fluorinated monoethylenically unsaturated monomer containing at least as many fluorine atoms as carbon atoms, said polymer having an inherent viscosity of about 0.4–1.1 at 30° C. at a concentration of 0.1% by weight in a mixed solvent of 86.1% by weight tetrahydrofuran and 13.9% by weight dimethylformamide, said polymer having a polymer chain non-ionic end-group concentration of about 55–95 molar percent.

2. A polymer of claim 1 wherein the polymer nonionic end-group concentration is 55–80 molar percent.

3. A polymer of claim 1 consisting essentially of units of vinylidene fluoride, hexafluoropropene and tetrafluoroethylene, the hexafluoropropene units being 19–60% and tetrafluoroethylene units being 3–35% by weight of the total polymer.

4. A polymer of claim 3 wherein the tetrafluoroethylene units are 15–25% by weight of the total polymer.

References Cited

UNITED STATES PATENTS

| 2,956,048 | 10/1960 | Bolstad et al. | 260—87.7 |
| 2,968,649 | 1/1961 | Pailthorp | 260—80.5 |
| 3,051,677 | 8/1962 | Rexford | 260—29.6 |
| 3,069,401 | 12/1962 | Gallagher | 260—87.7 |
| 3,080,347 | 3/1963 | Sandberg et al. | 260—80.5 |
| 3,136,745 | 6/1964 | Albin et al. | 260—87.7 |
| 3,178,399 | 4/1965 | Lo | 260—87.7 |
| 3,335,106 | 8/1967 | Sianesi et al. | 260—29.6 |

HARRY WONG, JR., Primary Examiner

S. M. LEVIN, Assistant Examiner

U.S. Cl. X.R.

260—87.7, 80.76, 41 C